United States Patent [19]

Nakajima et al.

[11] 4,116,181
[45] Sep. 26, 1978

[54] DUAL SPARK PLUG IGNITION INTERNAL COMBUSTION ENGINE

[75] Inventors: Yasuo Nakajima, Yokosuka; Yoshimasa Hayashi, Yokohama, both of Japan

[73] Assignee: Nissan Motor Company, Limited, Yokohama, Japan

[21] Appl. No.: 768,700

[22] Filed: Feb. 14, 1977

[30] Foreign Application Priority Data

Feb. 16, 1976 [JP] Japan .................................. 51-15704

[51] Int. Cl.² ........................................... F02M 25/06
[52] U.S. Cl. ................................................ 123/119 A
[58] Field of Search .......... 123/119 A, 191 A, 191 R, 123/148 C, 148 DS, 90.27, 52 M, 59 R; 60/278, 323

[56] References Cited

U.S. PATENT DOCUMENTS

| | | | |
|---|---|---|---|
| 1,171,211 | 2/1916 | Keiper | 123/90.27 |
| 1,459,630 | 6/1923 | Spina | 123/90.27 |
| 1,722,145 | 7/1929 | Hermann | 123/119 A |
| 2,257,631 | 9/1941 | Wahlberg | 60/323 |
| 2,576,819 | 11/1951 | Angle | 123/41.69 |
| 3,164,143 | 1/1965 | Dolza | 123/90.27 |
| 3,219,019 | 11/1965 | Palmer | 123/90.27 |
| 3,885,538 | 5/1975 | Suter | 123/119 A |
| 3,901,203 | 8/1975 | Pozniak | 123/119 A |
| 3,945,365 | 3/1976 | Regueiro | 123/148 DS |
| 4,031,867 | 6/1977 | Yasuda et al. | 123/119 A |

FOREIGN PATENT DOCUMENTS 2,621,533  9/1976  Fed. Rep. of Germany ....... 123/148 C

*Primary Examiner*—Wendell E. Burns
*Attorney, Agent, or Firm*—Bacon & Thomas

[57] ABSTRACT

Two spark plugs are disposed in each combustion chamber of an internal combustion engine to effectively ignite the air-fuel mixture which is mixed with a relatively large amount of the exhaust gases which is supplied into the combustion chamber from the exhaust system of the engine. Each spark plug is located so that the electrodes thereof lie at the same height as the center of an intake valve seat in the combustion chamber.

9 Claims, 5 Drawing Figures

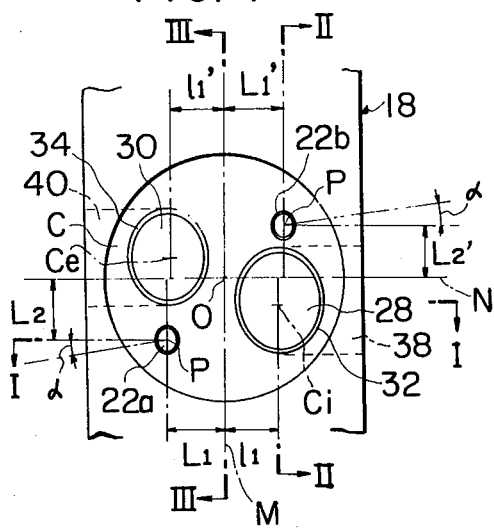
FIG. 1
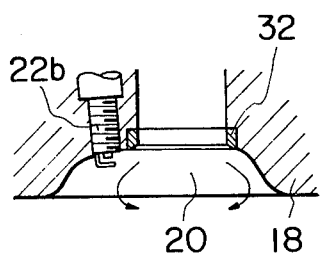
FIG. 3
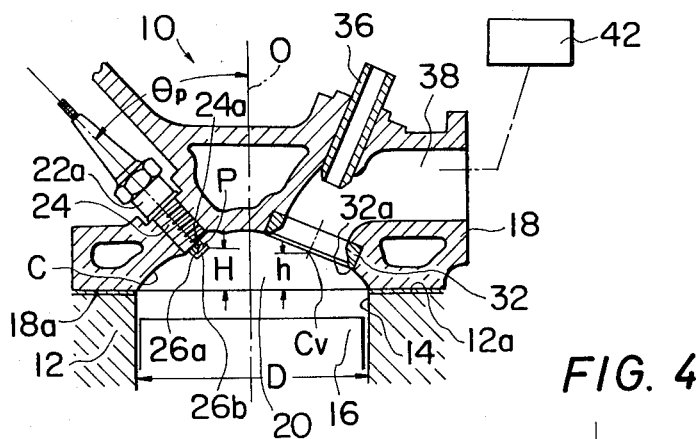
FIG. 2
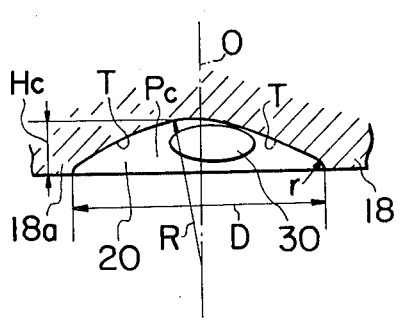
FIG. 5
FIG. 4

DUAL SPARK PLUG IGNITION INTERNAL COMBUSTION ENGINE

BACKGROUND OF THE INVENTION

1. Field of the Invention

This invention relates to a dual spark plug ignition internal combustion engine which is arranged to lower the emission level of nitrogen oxides by supplying a portion of the exhaust gases into the combustion chamber of the engine, and more particularly to a cylinder head configuration of the same engine.

2. Description of the Prior Art

It has already been proposed that the combustion chamber of an internal combustion engine is supplied with a relatively large amount of the exhaust gases of the engine to mix with the air-fuel mixture in the combustion chamber, and then the air-fuel mixture mixed with the exhaust gases is ignited with two spark plugs disposed in each combustion chamber in order to lower the emission level of nitrogen oxides (NOx) maintaining relatively stable and smooth engine running.

However, the engine arranged according to the above-described proposition now requires to achieve more stable and smooth running and accordingly requires more stable combustion carried out in the combustion chamber under the condition in which a relatively large amount of the exhaust gases is supplied to the combustion chamber. Experiments reveals that the more stable combustion is achieved by expelling the combustion gases or burnt gases existing adjacent the spark plugs, adequately cooling the the spark plugs with a stream of new air-fuel mixture supplied through the intake port of the engine. The stable combustion is further improved by the secure ignition to the air-fuel mixture due to two equivalent intensity of sparks produced by the two spark plugs under generally the same condition. In this regard, it is now required to provide an improved engine which meets the above-described various conditions for achieving the stable combustion in the combustion chamber of the engine.

SUMMARY OF THE INVENTION

According to the present invention, two spark plugs and an intake valve seat are disposed at the concavity surface of the cylinder head of an internal combustion engine so that the electrodes of the two spark plugs are located generally at the same height in the combustion chamber as the center of the intake valve seat.

It is an object of the present invention to provide an improved dual-spark ignition internal combustion engine which can improve the combustion of air-fuel mixture carried out in the combustion chamber of a dual-spark ignition engine.

Another object of the present invention is to provide an improved dual-spark ignition internal combustion engine which can effectively expel the combustion gases existing adjacent the two spark plugs, adequately cooling the two spark plugs.

A further object of the present invention is to provide an improved dual spark ignition internal combustion engine in which two spark plugs disposed in each combustion chamber are located to carry out the ignition of the air-fuel mixture under the generally same condition.

Other objects, features, and advantages of the engine according to the present invention will more apparent from the following description of the preferred embodiment thereof taken in conjunction with the accompanying drawings.

BRIEF DESCRIPTION OF THE DRAWINGS

FIG. 1 is a schematical plan view of a part of the cylinder head of a preferred embodiment of an internal combustion engine in accordance with the present invention;

FIG. 2 is a cross-sectional view of a part of the engine of FIG. 1, showing the cylinder head in cross-section taken along the line I—I of FIG. 1;

FIG. 3 is a schematical cross-sectional view taken along the line II—II of FIG. 1, showing the stream of the air-fuel mixture supplied to the combustion chamber of the engine;

FIG. 4 is a schematical cross-sectional view similar to FIG. 2, showing the intake and exhaust valve arrangement; and FIG. 5 is a schematical cross-sectional view taken along the line III—III of FIG. 1, illustrating the shape of the combustion chamber defined by the cylinder head.

DESCRIPTION OF THE PREFERRED EMBODIMENT

Referring now to FIGS. 1 and 2, there is shown a preferred embodiment of an internal combustion engine generally designated by the reference numeral 10, which is composed of an cylinder block 12. Formed in the cylinder block 12 is a cylinder 14 or cylinders in which a piston or pistons are reciprocally movably disposed as customary. A cylinder head 18 is secured at its bottom flat surface 18a to the top flat surface 12a of the cylinder block 12. The cylinder head 18 is formed with a concavity C of which surface (not numeral) closes one or upper end of the cylinder bore and defines a combustion chamber 20 between the concavity surface and the crown of the piston 16.

Two spark plugs 22a and 22b are screwed at their threaded portions 24 into the cylinder head 18 so that the midpoint P of the spark plug gap formed between a center electrode 26a and a side electrode 26b of each spark plug projects and lies in the combustion chamber 20. As shown, the spark plugs 22a and 22b are disposed such that the center 24a of the top surface of their threaded portion 24 exposed to the combustion chamber is located on the extension of the surface of the concavity C. Furthermore, the two spark plugs 22a and 22b are located such that the midpoints P of the spark plug gaps thereof lie opposite to each other with respect to a longitudinal vertical plane M, and lie opposite to each other with respect to a lateral vertical plane N. The longitudinal vertical plane M is parallel with the longitudinal axis (not shown) of the cylinder head and passes through the center axis O of the cylinder or the center axes of the cylinders. The lateral vertical plane N is perpendicular to the longitudinal vertical plane M and passes through the cylinder center axis O. As seen, the two spark plugs 22a and 22b are located in a manner that the midpoints P of the spark plug gaps thereof are generally symmetrically opposite to each other with respect to the cylinder center axis O.

Intake and exhaust valve heads 28 and 30 are, as usual, seatably disposed on intake and exhaust valve seats 32 and 34 which are secured to the surface of the concavity C by being embedded in the cylinder head 18. The intake valve seat 32 is formed with an annular surface 32a which is exposed to the combustion chamber 20. The intake valve head 28 is integral with a valve stem (not shown) which is slidably and movably disposed in a valve guide 36 secured to the cylinder head 18. As shown in FIG. 1, the intake and exhaust valve heads 28 and 30 are located opposite to each other with respect to the longitudinal vertical plane M. Additionally, the center $C_i$ and $C_e$ of the valve heads 28 and 30 lie opposite to each other with respect to the lateral vertical plane N. The centers $C_i$ and $C_e$ reside on the surfaces of the intake and exhaust valve heads 28 and 30, respectively, the surfaces being exposed to the combustion chamber 20. Furthermore, the centers $C_i$ and $C_e$ of the intake and exhaust valve heads 28 and 30 are spaced apart from the cylinder center axis O in the direction of the longitudinal axis of the cylinder head 18.

As best seen in FIG. 2, two spark plugs 22a and 22b are located in a manner that the midpoint P of the spark plug gap of each spark plug lie at a first predetermined height H or distance from the bottom flat surface 18a of the cylinder head 18. The center $C_v$ of the intake valve seat 32 is at a second predetermined height $h$ or a distance from the bottom flat surface 18a of the cylinder 18, the center $C_v$ lying on the extension of the annular surface 32a of the intake valve seat 32. It is to be noted that the second predetermined height $h$ is generally or about same as the first predetermined height H. Preferably, the second predetermined height $h$ is in the range from first predetermined height H − 4.2mm to the first predetermined height H + 4.2mm.

In addition to the above-mentioned arrangement, preferably the two spark plugs 22a and 22b are located so that the sum of the minimum distances $L_1$ and $L_1'$ of the midpoints P of the spark plug gaps thereof from the longitudinal vertical plane M is within the range from 0.23 times to 0.47 times the bore diameter D of the cylinder 14. Furthermore, the sum of the minimum distances $L_2$ and $L_2'$ of the midpoints P of the spark plug gaps of the two spark plugs 22a and 22b are within the range from 0.43 times to 0.54 times the cylinder bore diameter D. With this connection, the intake and exhaust valve heads 28 and 30 are located so that the sum of the minimum distances $l_1$ and $l_1'$ of the centers $C_i$ and $C_e$ thereof from the longitudinal vertical plane M is within the range from 0.40 to 0.51 times the cylinder bore diameter D. It will be understood that the minimum distances $L_1$ and $L_1'$ of the two spark plugs 22a and 22b from the longitudinal vertical plane M may not be equal, and the minimum distances $l_1$ and $l_1'$ of the intake and exhaust valve heads 28 and 30 from the longitudinal vertical plane M may also not be equal.

Moreover, each spark plug 22a or 22is preferably located so that the center axis (shown in FIG. 2) of each spark plug 22a or 22b intersects the cylinder center axis O at an angle $\theta_p$ in the range of 45° ± 10°, as viewed from the direction of the plane M in FIG. 1. Additionally, each spark plug is located in a manner that the center axis thereof intersects the lateral vertical plane N at an angle $\alpha$ in the range of 1° in the direction of the lateral vertical plane N and of 13° in the opposite direction, when projected on the extension of the bottom flat surface 18a of the cylinder head 18, as shown in FIG. 1. The valve stems (only their center axes are shown in FIG. 4) integral with the intake and exhaust valve heads 28 and 30 are preferably disposed so that the center axes $A_1$ and $A_2$ thereof are generally perpendicular to the surface of the concavity C of the cylinder head 18. Moreover, the center axes $A_1$ and $A_2$ of the intake valve stems respectively intersect the cylinder center axis O at angles $\theta_1$ and $\theta_2$ which are within the range from 15° to 39°, as viewed from the direction of the plane M in FIG. 1, as best seen in FIG. 4.

In FIGS. 1 and 2, the reference numerals 38 and 40 indicate intake and exhaust ports which are communicable with the combustion chamber 20 through intake and exhaust valve heads 28 and 30, respectively. In this case, the intake port 38 opens to one side of the cylinder head 18, whereas the exhaust port 40 opens to the opposite side of the same. With this arrangement, the cylinder head 18 shown FIG. 1 is referred to as a cross-flow induction-exhaust one. Indicated operatively connected to the intake port 38 is a device 42 or means for supplying or recirculating a portion of the exhaust gases of the engine into to the combustion chamber 20 through the intake port 38. The exhaust supply device 42 is preferably arranged to supply the exhaust gases in the amount, at maximum, ranging from 25 to 40% by volume of the amount of the intake air inducted into the combustion chamber 20.

With reference to FIG. 5, the shape of the combustion chamber 20 will be discussed hereinafter. In this case, the surface of the concavity C defining the upper part of the combustion chamber 20 is fundamentally and theoretically made as follows: at first the vertex of the concavity C in section is formed with a relatively large radius R with its center at a point of cylinder center axis O, and the peripheral portion of the concavity C in section is formed with a relatively small radius $r$. The tangent lines T of the vertex and the peripheral portion of the concavity C are thereafter connected to each other to form a plane $P_c$ in the form of a mountain having gentle slope. Lastly, the plane $P_c$ is rotated about the cylinder center axis O to make the combustion chamber 20 generally of the cone shape. Therefore, the combustion chamber 20 shown in FIG. 2 becomes generally of the cone shape though the combustion chamber shape is slightly deformed in order to install the spark plugs and the intake and exhaust valve seats to the concavity surface defining the combustion chamber 20. It is to be noted that the relatively large radius R of the vertex of the concavity surface is preferably within the range from 0.45 times to 0.69 times the bore diameter D of the cylinder 14, and the relatively small radius $r$ of the peripheral portion of the concavity surface is preferably within the range from 0 to 4 mm. Additionally, the height $H_c$ of the combustion chamber 20 or the distance between the vertex of the concavity C and the extension of the cylinder head bottom flat surface 18a along the cylinder center axis O is within the range from 0.18 times to 0.30 times a stroke of the piston or the distance between a predetermined point of the piston at top dead center and the predetermined point of the piston at bottom dead center.

With the arrangement hereinbefore, since the center $C_v$ of the intake valve seat 32 is located generally at the same height from the cylinder head bottom flat surface 18a as the midpoints P of the spark plug gaps of the two spark plugs 22a and 22b, the air-fuel mixture is supplied through the intake port 38 into the combustion chamber 20 as indicated by the arrows in FIG. 3 and accordingly the air-fuel mixture does not directly strike against the spark plugs 22a and 22b. As a result, the two spark plugs 22a and 22b are adequately cooled and the combustion gases or burnt gases existed adjacent the two spark plugs are compulsorily expelled by the effect of the flowing new air-fuel mixture indicated by the arrows. Therefore, secure and stable ignition of the air-fuel mixture is achieved in the combustion chamber 20 even if a relatively large amount of the exhaust gases is supplied to the combustion chamber 20. Additionally, the two spark plugs 22a and 22b can produce the generally same intensity of sparks under the same condition since the air-fuel mixture inducted into the combustion chamber 20 does not excessively cool only one of the two spark plugs, particularly the spark plug 22a of which electrodes are located on the extension of the intake port 38.

In addition, since the combustion chamber 20 is generally formed into a cone shape, the surface area and the volume of the combustion chamber defined by the cylinder head 18 is decreased compared with in the case of a usual hemispherical combustion chamber when intending to obtain the same relatively large diameters of the intake and exhaust valve heads. The relatively large diameters of the intake and exhaust valve heads are necessary to obtain required volumetric efficiency and scavenging efficiency. Accordingly, the combustion carried out in the combustion chamber is improved as compared with in the case of the hemispherical combustion chamber because the cooling effect by the cylinder head concavity surface is smaller than in the hemispherical combustion chamber. This improved combustion makes possible to further increase the amount of the exhaust gases recirculated or supplied into the combustion chamber and to further extend the lean operating limit of the engine. As a result, the more stable and smooth running of the engine is effectively accomplished.

What is claimed is:

1. An internal combustion engine including a cylinder block having therein a cylinder in which a piston is reciprocally movably disposed, comprising:

a cylinder head secured at its flat surface to the flat surface of the cylinder block and formed with a concavity, the surface of the concavity closing one end of the cylinder and defining a combustion chamber between the concavity surface and the crown of the piston;

two spark plugs secured to the cylinder head such that the midpoints of the spark plug gaps formed between the center and side electrodes thereof project and lie in the combustion chamber and lie generally opposite to each other with respect to the center axis of the cylinder, the midpoint of the spark plug gap of each spark plug being located at a first predetermined distance from the extension of the flat surface of said cylinder head in the direction of the center axis of the cylinder;

intake and exhaust valve seats embedded in the concavity surface of said cylinder head, said intake valve seat having an annular surface which is exposed to the combustion chamber, the center of said intake valve seat which lies on the extension of the annular surface being located at a second predetermined distance from the extension of the flat surface of said cylinder head in the direction of the cylinder center axis, the second predetermined distance being in the range of from slightly larger to smaller than the first predetermined distance;

intake and exhaust valve heads respectively seatably disposed on said intake and exhaust valve seats, the centers of said intake and exhaust valve heads which lie on the surfaces exposed to the combustion chamber being located generally opposite to each other with respect to the cylinder center axis; and means for supplying a portion of the exhaust gases of the engine into the combustion chamber.

2. An internal combustion engine as claimed in claim 1, in which the second predetermined distance is in the range from 4.2 mm less to 4.2 mm more than the first predetermined distance.

3. An internal combustion engine as claimed in claim 2, in which said two spark plugs are disposed such that the midpoints of the electrodes thereof lie opposite to each other with respect to a longitudinal vertical plane which is parallel with the longitudinal axis of the cylinder head and passes through the center axis of the cylinder, and lie opposite to each other with respect to a lateral vertical plane perpendicular to the longitudinal vertical plane and passing through the center axis of the cylinder; and said intake and exhaust valve heads are disposed opposite to each other with respect to the longitudinal vertical plane, the centers of the intake and exhaust valve heads lying opposite to each other with respect to the lateral vertical plane.

4. An internal combustion engine as claimed in claim 3, in which said two spark plugs are located such that the sum of the minimum distances of the midpoints of the spark plug gaps thereof from the longitudinal vertical plane of the cylinder head is in the range from 0.23 times to 0.47 times the bore diameter of the cylinder.

5. An internal combustion engine as claimed in claim 4, in which said two spark plugs are located such that the sum of the minimum distances of the midpoints of the spark plug gaps thereof from the lateral vertical plane of the cylinder head is in the range from 0.43 times to 0.54 times the bore diameter of the cylinder.

6. An internal combustion engine as claimed in claim 5, in which said intake and exhaust valve heads are located such that the sum of the minimum distance of the centers thereof from the longitudinal vertical plane is in the range from 0.40 times to 0.51 times the bore diameter of the cylinder.

7. An internal combustion engine as claimed in claim 6, in which said two spark plugs are located such that the longitudinal axis of each spark plug intersects the cylinder center axis at an angle ranging from 35° to 55°, as viewed from the direction of the longitudinal vertical plane.

8. An internal combustion engine as claimed in claim 7, in which said two spark plugs are located so that the center axis of each spark plug intersect the lateral vertical plane at an angle in the range of 1° in the direction of the lateral vertical plane and of 13° in the opposite direction, when projected on the extension of the bottom flat surface of the cylinder head.

9. An internal combustion engine as claimed in claim 1, in which the exhaust gas supply means is arranged to supply the exhaust gases in the amount, in maximum, ranging from 25% to 40% by volume of the intake air inducted into the combustion chamber.

* * * * *